United States Patent [19]
Di Fiore et al.

[11] 3,911,036
[45] Oct. 7, 1975

[54] METHOD OF PRODUCING DICHLOROETHANE

[75] Inventors: Lucio Di Fiore; Benedetto Calcagno, both of Milan, Italy

[73] Assignee: Societa Italiana Resine S.I.R. S.p.A., Milan, Italy

[22] Filed: July 31, 1972

[21] Appl. No.: 276,613

[30] Foreign Application Priority Data
Nov. 17, 1971  Italy.................................. 31198/71

[52] U.S. Cl. ............................................... 260/660
[51] Int. Cl.² ........................................... C07C 17/02
[58] Field of Search ......................... 260/660, 658 R

[56] References Cited
UNITED STATES PATENTS
2,929,852  3/1960  Benedict............................. 260/660
3,338,982  8/1967  Leach et al. ........................ 260/660

FOREIGN PATENTS OR APPLICATIONS
1,184,576  3/1970  United Kingdom.................. 260/660
1,112,504  8/1961  Germany ............................. 260/660

Primary Examiner—Delbert E. Gantz
Assistant Examiner—Joseph A. Boska
Attorney, Agent, or Firm—Sughrue, Rothwell, Mion, Zinn & Macpeak

[57] ABSTRACT

Dichloroethane is made by part conversion of ethylene with chlorine in a boiling dichloroethane medium followed by separation of dichloroethane product from unconverted ethylene and conversion of that ethylene in a similar but cooled medium, the product from the cooled conversion stage being recycled to the boiling conversion stage.

3 Claims, 1 Drawing Figure

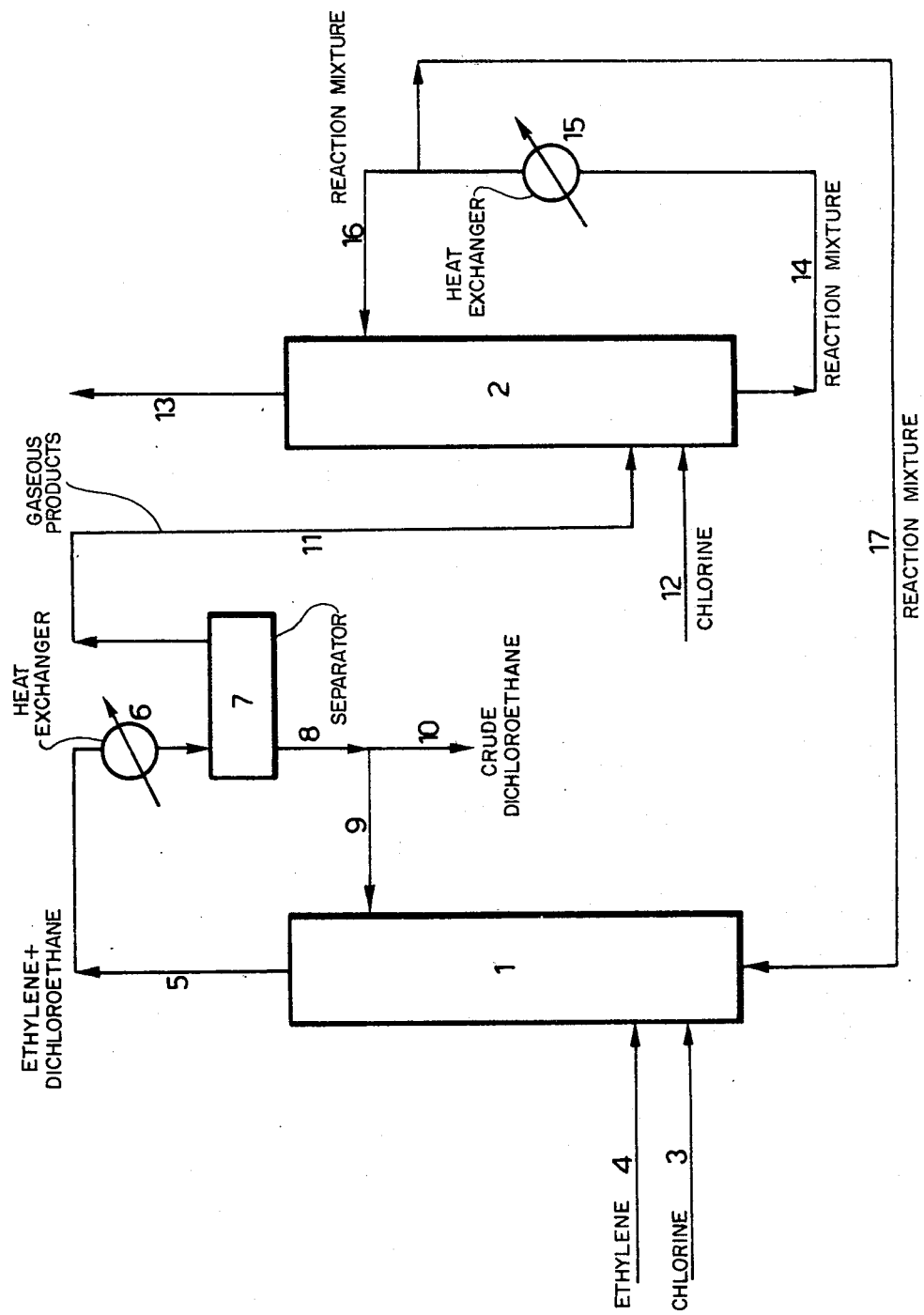

METHOD OF PRODUCING DICHLOROETHANE

BACKGROUND OF THE INVENTION

The present invention relates to an improvement in the production of dichloroethane by processes in which this product is obtained by reaction of ethylene with chlorine.

Dichloroethane is a very useful product in industry, being useful both as a solvent and as an intermediate substance in the preparation of highly interesting chemical products such as for example vinyl chloride and ethylenediamine.

DESCRIPTION OF THE PRIOR ART

According to a method known in the art, dichloroethane is prepared by supplying a stream of gas consisting of ethylene, hydrogen chloride and oxygen, or a gas containing molecular oxygen, over a solid oxychlorination catalyst.

According to another known technique, dichloroethane is obtained by supplying gaseous chlorine and ethylene to a liquid medium consisting essentially of dichloroethane, working at low temperature or at elevated temperature, the said medium containing a halogenation catalyst.

If the process is carried out at elevated temperature, the heat of reaction is carried away by maintaining the reaction medium at boiling temperature.

More particularly, the process is carried out at the boiling temperature of the reaction medium, without application of external overpressure, and the dichloroethane vapors which develop are condensed.

This condensate is partly recycled to the reaction ambient, the remaining part being discharged and then subjected to fractionation for recovery of high purity dichloroethane.

This procedure offers various advantages. Above all, it is easy to control the reaction conditions, particularly the temperature which is maintained constant at the boiling level of the reaction medium.

Apart from the dichloroethane fraction which is discharged from the halogenation reactor and which is subjected to fractionation, no particular prior treatment is required, so that the process itself is substantially simplified.

The fundamental disadvantage of the process described consists in the relatively low yields of dichloroethane, on account of the formation of products of a higher degree of chlorination.

In low temperature processes, the working temperatures are below the boiling temperatures of the reaction medium, and the heat developed in chlorination is carried away by means of heat exchangers located within the reaction mixture or outside the reactor. More particularly, in such processes, the temperature is maintained at values ranging from zero degrees to 40°C and normally the reaction mixture is recycled through a heat exchanger.

This procedure has essentially the advantages relative to production of higher purity dichloroethane than is possible by processes in which elevated temperature is employed.

In fact, when chlorinating ethylene at low temperature, the formation of products with a higher degree of chlorination is substantially avoided.

The disadvantages of this process reside in the troublesome treatments to which the dichloroethane discharged from the reaction ambient has to be subjected.

In fact, the halogenation catalyst must first be separated from the fraction discharged, the catalyst normally consisting of ferric chloride, elimination being achieved by an alkaline treatment. This is followed by washing with water until neutrality is achieved and only after dehydration is it possible to subject this fraction to fractionation in order to obtain high purity dichloroethane.

SUMMARY OF THE INVENTION

It is now been found possible to avoid the drawbacks described in the prepartion of dichloroethane by using processes in which gaseous chlorine and ethylene are supplied to a liquid reaction medium constituted essentially by dichloroethane, the said medium containing a halogenation catalyst. The present invention is based essentially on the discovery that in processes in which dichloroethane is prepared by reaction of ethylene with chlorine at elevated temperature, the formation of products with a higher degree of chlorination is practically avoided when a substantial quantity of ethylene in free form is maintained in the liquid reaction medium.

Therefore, the process according to the present invention consists essentially in bringing into contact, in a first stage of reaction, gaseous chlorine and ethylene in a boiling reaction medium constituted essentially of dichloroethane, under conditions such as to convert the ethylene only partially into dichloroethane, chlorination of the unreacted ethylene than being completed in a second stage, in a reaction medium consisting essentially of dichloroethane which is maintained at low temperature.

Furthermore, in both stages of reaction, a halogenation catalyst is present which is preferably constituted by ferric chloride.

BRIEF DESCRIPTION OF THE DRAWING

The drawing illustrates basic features of the invention including a two stage chlorination and the relationship therebetween.

DETAILED DESCRIPTION OF THE INVENTION

Referring to the attached FIGURE in which reference numeral 1 denotes the chlorination reactor in which the ethylene is partially converted into dichloroethane, 2 indicates the reactor in which conversion of the ethylene into dichloroethane is completed.

More particularly, at the foot of the reactor 1, a stream of gaseous ethylene is supplied through the pipe 4 while a stream of gaseous chlorine is supplied through the pipe 3.

The reactor 1 contains a liquid reaction medium consisting essentially of dichloroethane, the said medium containing a catalyst such as ferric chloride, cupric chloride or others in quantities of 0.05 to approximately 3 g/liter.

Of these catalysts, ferric chloride is preferred.

In addition, chlorination of the ethylene is carried out in reactor 1 without the application of an external overpressure, at the boiling temperature of the liquid reaction medium.

A fundamental aspect of the process according to the present invention is the maintenance of a substantial quantity of free ethylene in the first stage of chlorination.

In practice, ethylene is supplied to the reactor 1 through the pipe 4 and this ethylene is converted to dichloroethane in a quantity of not less than 17 percent with respect to the quantity supplied, and preferably in quantities of 17 to 50 percent.

For this purpose, in the preferred embodiment, chlorine is supplied to the reactor 1 through the pipe 3 in a quantity smaller than that stoichiometrically necessary to convert the ethylene to dichloroethane, and total conversion of the chlorine supplied is achieved in this stage of the reaction.

Obviously, in this case, the quantity of chlorine supplied to the reactor 1 will be such as will permit conversion of the ethylene in those percentages which have been previously defined, the fraction of chlorine necessary for completion of the reaction being supplied to the second stage of reaction (reactor 2).

In the first stage of reaction, the reaction heat is controlled by boiling of the reaction medium, the vapors which are given off and which consist essentially of dichloroethane and ethylene, are drawn off at the head of the reactor 1 through the pipe 5 and are then passed to the separator 7 after cooling by passing over the heat exchanger 6. The normally liquid products which consist essentially of dichloroethane are separated in 7. These liquid products are drawn off through the pipe 8, discharged through the pipe 10 and are rectified for the production of high purity dichloroethane.

A part of the products of reaction may possibly be recycled to the reactor 1 through the pipe 9. The normally gaseous products separated in 7 are passed through the pipe 11 to the foot of the chlorination reactor 2. Chlorine is fed to this reactor through the pipe 12. The reactor 2 contains a reaction medium consisting essentially of dichloroethane, the said medium containing a catalyst chosen from those described from hereinabove, in quantities ranging from 0.05 up to approximately 3 g/liter. In this case, too, ferric chloride is preferred. In addition, chlorination of ethylene is carried out in reactor 2 at temperatures of 0° to 40°C and complete conversion of the gaseous reagents is brought about in this stage.

For this purpose, the ethylene and the corresponding stoichiometric quantity of chlorine are supplied to the reactor 2 in which the exothermic pattern of the reaction is controlled by means of a heat exchanger which is preferably located outside the reactor itself. Therefore, the reaction mixture is drawn off through the pipe 14 at the bottom of the reactor 2 and is fed back to the said reactor through the pipe 16 after it has passed through the heat exchanger 15. Furthermore, the level of liquid is maintained constant in the reactor 2 by drawing off part of the reaction medium as chlorination proceeds and feeding it to the reactor 1 through the pipe 17.

Proceeding according to the present invention provides firstly the advantage of high selectivity in the chlorination of ethylene to form dichloroethane.

In fact, the selectivity in terms of ethylene converted is better than approximately 98 percent in moles, the reagents being virtually completely exhausted.

Another advantage of the present invention resides in the fact that the product discharged has a high concentration of dichloroethane which can be subjected to fractional distillation without any prior treatment.

An experimental example is given below and will serve to illustrate the invention further without, however, limiting it in any way.

EXAMPLE

Referring to the attached FIGURE, 54 kg/hr gaseous ethylene and 23 kg/hr gaseous chlorine are fed to the reactor 1 through pipes 3 and 4 respectively. The reactor 1 contains boiling dichloroethane and ferric chloride catalyst in quantities equal to 0.5 percent by weight with respect to the dichloroethane.

The gaseous products are discharged through the pipe 5 and are cooled in the exchanger 6.

In the decanting vessel 7, the normally liquid products are separated from the gaseous products, these latter consisting essentially of unaltered ethylene.

The said gaseous products are supplied to the reactor 2 through the pipe 11.

107 kg/hr of chlorine are supplied to the same reactor through the pipe 12.

The reactor 2 contains dichloroethane and ferric chloride, this latter being in a quantity equal to 0.5 percent by weight with respect to the dichloroethane.

In the reactor 2, a temperature equal to approximately 30°C is maintained by drawing off reaction products through the pipe 14, cooling them in the exchanger 15 and recycling them to the reactor through the pipe 16.

In addition, approximately 148 kg/hr of the reaction products are passed from the reactor 2 to the reactor 1 through the pipe 17.

The liquid products which are separated in the decanting vessel 7 are discharged through the pipe 8 and are partly recycled to the reactor 1 through the pipe 9.

Approximately 180 kg/hr of chlorinated product are discharged through the pipe 10 and, subjected to distillation, they produce 177 kg/hr of pure dichloroethane.

We claim:

1. Process for the production of dichloroethane by the reaction of ethylene with chlorine, characterized in that:

in a first stage of reaction, gaseous ethylene and chlorine are fed into a boiling liquid reaction medium consisting essentially of dichloroethane and containing ferric chloride or cupric chloride without application of an external overpressure, the quantity of chlorine supplied to this stage being such as will bring about conversion of 17 percent of the ethylene supplied;

the gases emerging from this stage are cooled so as to separate the dichloroethane from the unaltered ethylene;

the said dichloroethane is recovered and subjected to rectification;

the unreacted ethylene is supplied to a second reaction stage containing a liquid reaction medium maintained at temperatures from 0° to 40°C, consisting essentially of dichloroethane and containing a chlorination catalyst, the quantity of chlorine supplied to this stage being such as will bring about substantially complete conversion of the ethylene to dichloroethane, the temperature in the second reaction stage being maintained by passing the product of reaction from the second stage through a heat exchanger and the recycling a portion of said product to said second stage;

the product of reaction from the second stage is recycled to the first stage of reaction.

2. Process according to claim 1, characterised that in the first and in the second stage of reaction, the reaction medium contains 0.05 to 3.0 percent by weight with respect of the dichloroethane, of a chlorination catalyst.

3. Process according to claim 2, in which the catalyst is ferric chloride.

* * * * *